(12) United States Patent
Holbein et al.

(10) Patent No.: US 8,496,269 B2
(45) Date of Patent: Jul. 30, 2013

(54) BELT BUCKLE PRESENTER

(75) Inventors: Wolfgang Holbein, Alfdorf (DE); Artur Klein, Lorch (DE); Nathalie Kramer, Alfdorf (DE); Martin Prokscha, Schorndorf (DE); Stefano Roehm, Schorndorf (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/304,767

(22) Filed: Nov. 28, 2011

(65) Prior Publication Data

US 2012/0299282 A1    Nov. 29, 2012

(30) Foreign Application Priority Data

Feb. 18, 2011  (DE) .................. 10 2011 011 780

(51) Int. Cl.
*B60R 22/36*   (2006.01)
(52) U.S. Cl.
USPC ........... 280/806; 280/807; 297/480; 24/163 R
(58) Field of Classification Search
USPC .................. 280/806, 807; 297/480; 24/163 R
See application file for complete search history.

(56) References Cited

U.S. PATENT DOCUMENTS

| 6,932,324 | B2* | 8/2005 | Biller et al. ................... 254/230 |
| 6,976,707 | B2* | 12/2005 | Modinger et al. ............ 280/806 |
| 7,063,353 | B2* | 6/2006 | Wang ............................ 280/735 |
| 7,188,868 | B2* | 3/2007 | Yamaguchi ................... 280/806 |
| 7,631,900 | B2* | 12/2009 | Nakayama et al. ........... 280/806 |
| 7,997,620 | B1* | 8/2011 | Dong et al. ................. 280/801.2 |
| 2010/0090454 | A1* | 4/2010 | Sugiyama et al. ............ 280/806 |

* cited by examiner

*Primary Examiner* — Toan To
(74) *Attorney, Agent, or Firm* — Tarolli, Sundheim, Covell & Tummino LLP

(57) ABSTRACT

The invention relates to a belt buckle presenter for a seat belt system of a vehicle comprising a belt buckle which is coupled to a spindle drive (16) through force transmission means (14), the force transmission means (14) including a locking member (40) which in normal operation is movable along a threaded spindle (30) of the spindle drive (16) in axial direction and in the case of restraint can be deformed by a restraining force acting on the belt buckle (12) so as to adopt a locking position in which the locking member (40) positively engages in the threaded spindle (30).

13 Claims, 4 Drawing Sheets

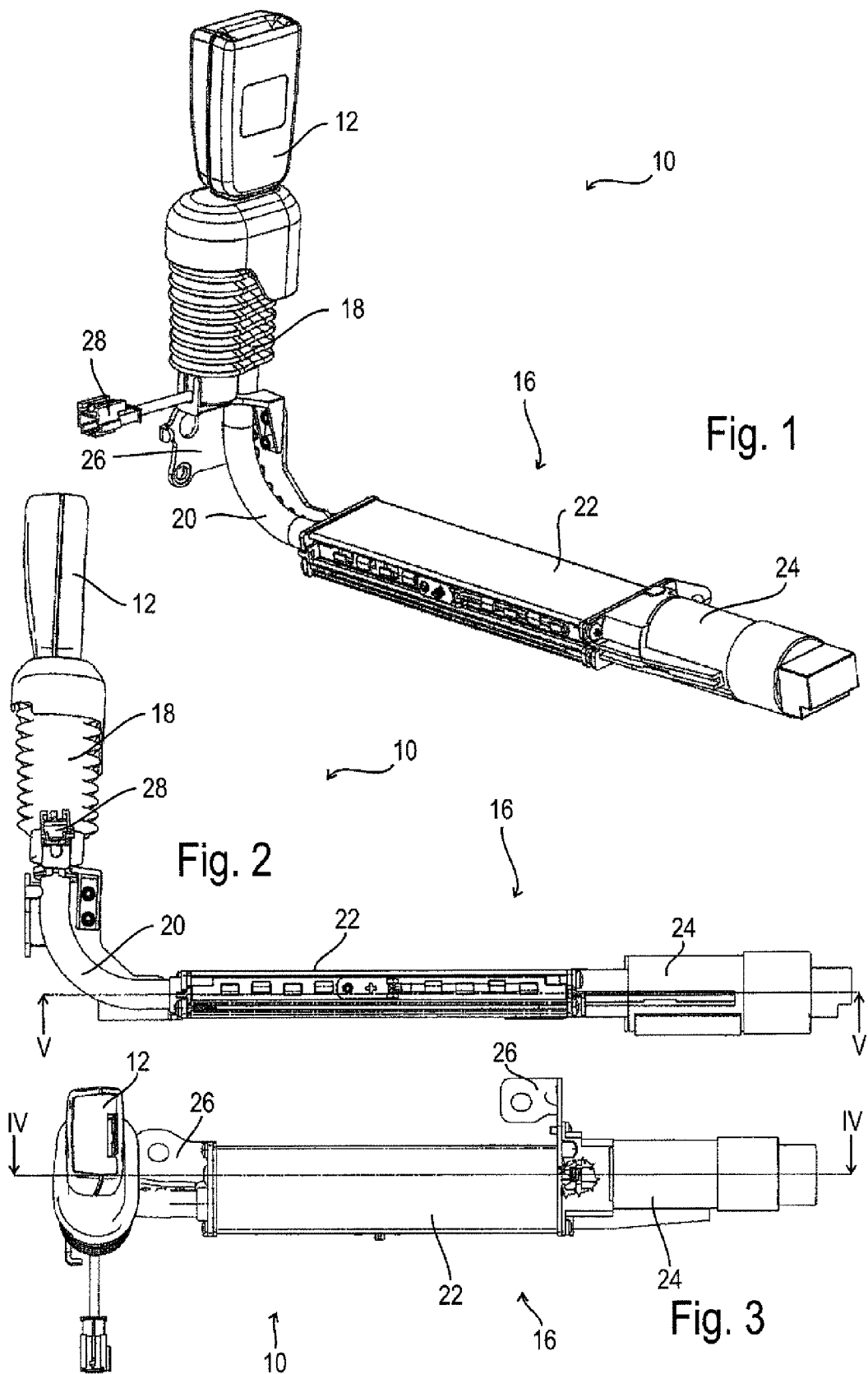

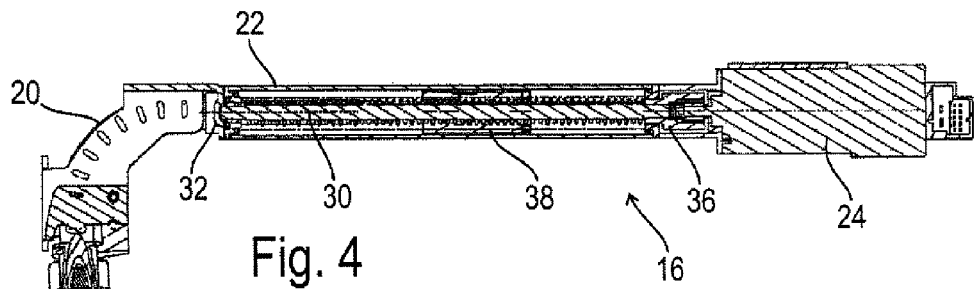
Fig. 4
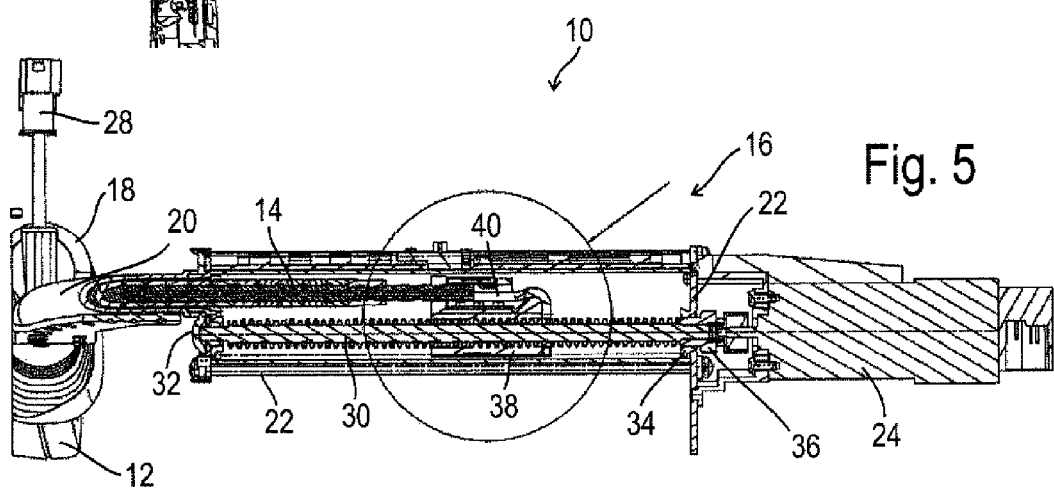
Fig. 5
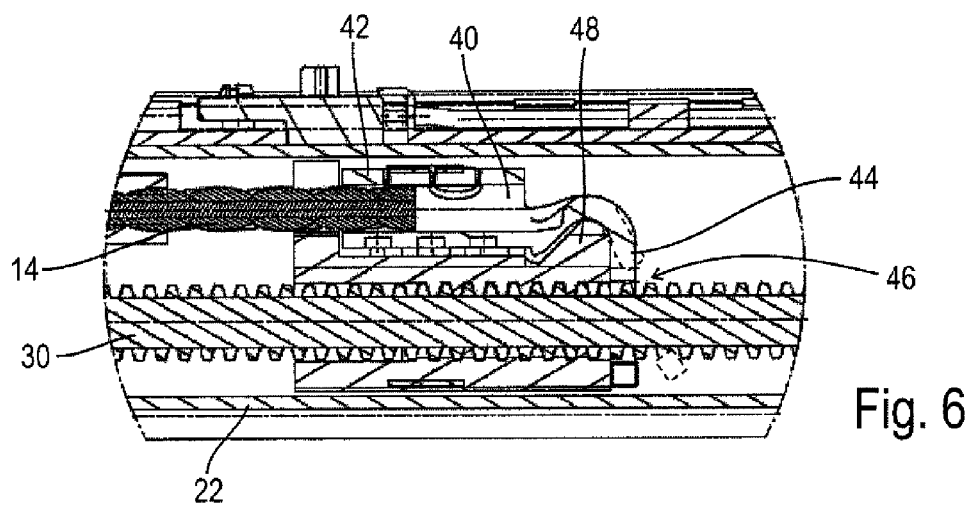
Fig. 6

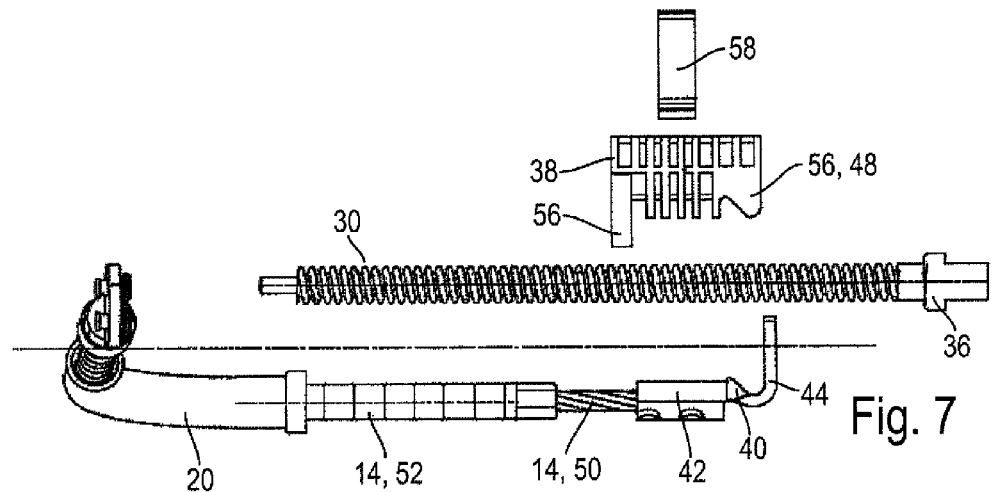
Fig. 7
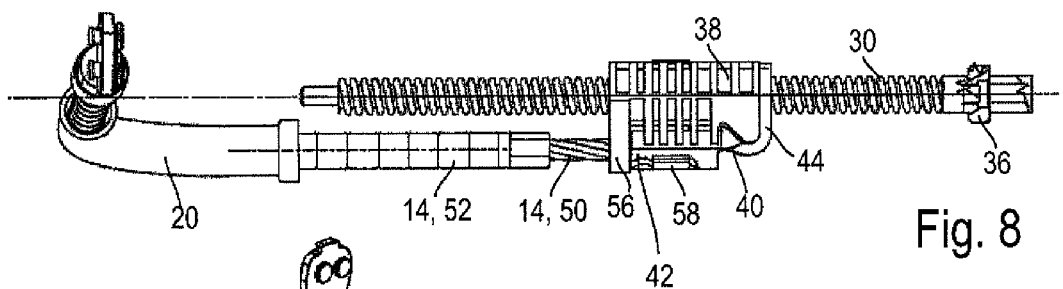
Fig. 8
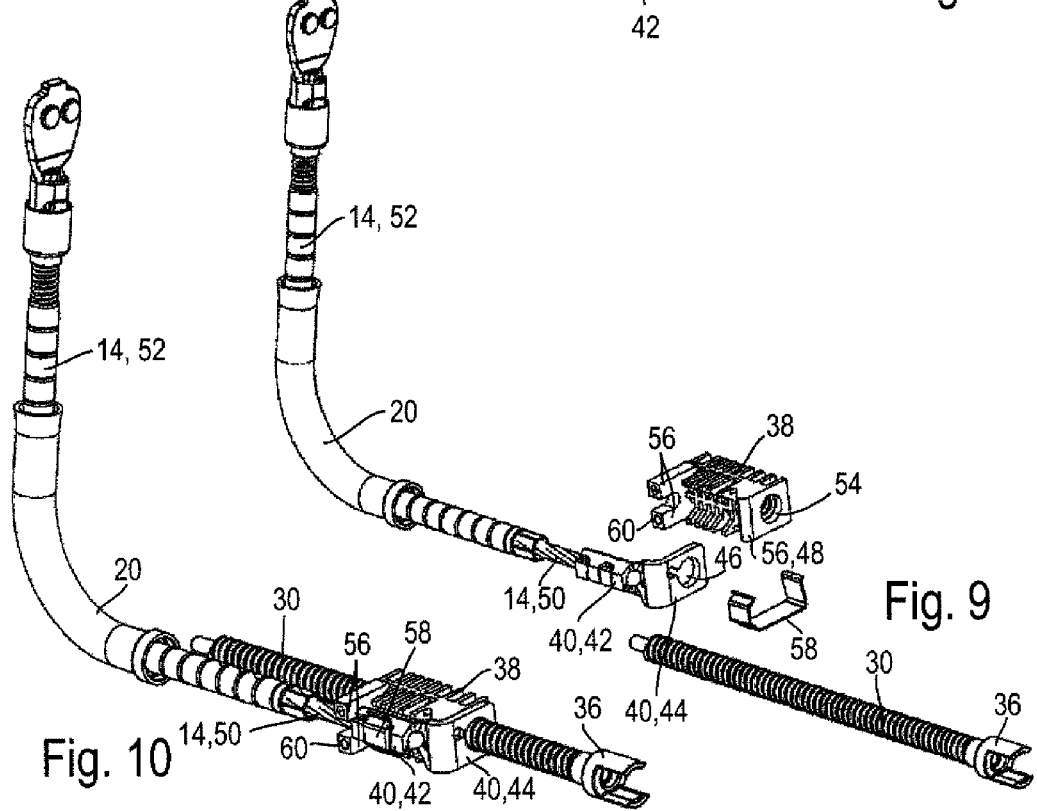
Fig. 9
Fig. 10

BELT BUCKLE PRESENTER

FIELD OF THE INVENTION

The invention relates to a belt buckle presenter for a seat belt system of a vehicle comprising a belt buckle which is coupled to a spindle drive by force transmission means.

BACKGROUND OF THE INVENTION

Belt buckle presenters of this type for seat belt systems are known from the state of the art and serve for moving the belt buckle for fastening the seat belt into a comfort position and a holding position. In the comfort position the insertion of the buckle tongue into the belt buckle can be facilitated. After fastening the seat belt the belt buckle is moved to a holding position at which a good restraining function of the safety belt system is ensured and/or the belt buckle does not hinder the vehicle occupant. Belt buckle presenters including a spindle drive are known, wherein the spindle nut and the spindle have to be designed so that in the case of restraint the force acting on the belt buckle can be absorbed by the spindle and the spindle nut.

It is the object of the invention to provide a belt buckle presenter having an improved force transmission in the case of restraint.

SUMMARY OF THE INVENTION

In accordance with the invention, this object is achieved by a generic belt buckle presenter, the force transmission means including a locking member which in normal operation is movable along a threaded spindle of the spindle drive in axial direction and can be deformed in the case of restraint by a restraining force acting on the belt buckle to adopt a locking position at which the locking member positively engages in the threaded spindle.

In this way, in the case of restraint a direct force transmission is achieved between the force transmission means and the threaded spindle by the locking member, wherein the spindle nut is not located in the flux of force. The load of the spindle drive is thus reduced and merely the threaded spindle and the support thereof have to absorb the restraining force. The locking member is configured so that in normal operation the function of the spindle drive is not influenced.

Preferably the locking member includes a mounting portion at which the locking member is tightly connected to the force transmission means and a reforming portion which is deformed in the locked position compared to a home position in normal operation. Thus merely the reforming portion has to be deformed, while the mounting portion of the locking member is not deformed.

The reforming portion of the locking member can have an eye the inner radius of which is larger than the radius of the threaded spindle and which in the home position accommodates the threaded spindle, whereby a safe positioning of the locking member is obtained.

A simple defined deformation of the locking member can be obtained by the fact that in the locked position the reforming portion with the eye is inclined toward the axis of the threaded spindle, the edge of the eye preferably engaging in the thread of the threaded spindle.

The eye can have at its inner radius a surface structure that increases the friction between the locking member and the threaded spindle in the locked position.

Preferably the spindle drive includes a spindle nut and the locking member is disposed at the spindle nut, whereby in normal operation the parts are jointly moved and are adapted to be pre-assembled.

With a predetermined restraining force the locking member can be deformed at the spindle nut by movement relative to the spindle nut, the latter preferably having a forming portion which induces a well-directed reforming of the locking member. A relative movement occurs between the spindle nut and the locking member which results in the deformation of the locking member.

In order to permit a force transmission between the spindle nut and the locking member and/or the force transmission means the spindle nut can be positively connected to the locking member and/or the force transmission means in axial direction.

For instance, a separate mounting means can be provided for connecting the locking member to the spindle nut. According to the preferred embodiment, the mounting means is a chip.

A low-weight, inexpensive embodiment which is easy to manufacture can be obtained by manufacturing the spindle nut of plastic material. This is possible especially when the spindle nut need not transmit the whole restraining force in the case of restraint.

A simple assembly of the spindle drive can be permitted by designing the spindle nut in axial direction in two parts constituting two shells which jointly surround the threaded spindle. The locking member is preferably accommodated inside the spindle nut between the two shells.

The threaded spindle can have a front axial bearing at its front end facing the belt buckle which in normal operation constitutes the axial bearing of the threaded spindle.

In order to prevent or reduce, in the case of restraint, deformation of the threaded spindle the latter has a rear axial stop at its rear end facing away from the belt buckle.

An improved and quicker engagement of the locking member in the threaded spindle can be achieved, when the threaded spindle includes asymmetric thread flanks.

In order to allow for good transmission of tensile forces as well as compressive forces the force transmission means can include a flexible transmission member for transmitting tensile forces and at least one pressure-stable flexible guiding sleeve for transmitting compressive forces.

The spindle drive is preferably designed to be self-locking so as to save any additional parts.

An improved control of the belt buckle presenter can be obtained by the belt buckle presenter comprising a position sensor adapted to detect a position of the threaded drive, preferably of the spindle nut.

BRIEF DESCRIPTION OF THE DRAWINGS

FIG. 1 shows a perspective view of a belt buckle presenter according to the invention;

FIG. 2 shows a lateral view of the belt buckle presenter of FIG. 1;

FIG. 3 shows a top view onto the belt buckle presenter of FIG. 1;

FIG. 4 is a sectional view of the belt buckle presenter along the sectional plane IV-IV according to FIG. 3;

FIG. 5 shows a sectional view of the belt buckle presenter in a sectional plane V-V according to FIG. 2;

FIG. 6 is a detailed view of the encircled cut-out of FIG. 5;

FIG. 7 shows an exploded view of a drive assembly of the belt buckle presenter according to FIG. 1;

FIG. 8 shows a top view onto the drive assembly of FIG. 7;

FIG. 9 shows a perspective exploded view of the drive assembly according to FIG. 7;

FIG. 10 shows a perspective view of the drive assembly according to FIG. 7;

DESCRIPTION OF THE EXAMPLE EMBODIMENT

Figure 11:
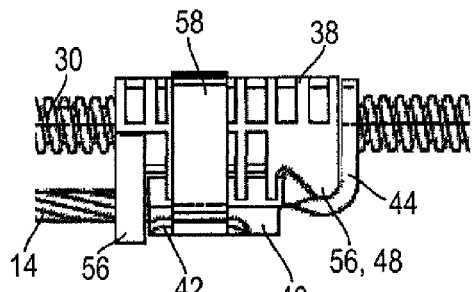
FIG. 11 shows a detailed view of the spindle nut including the locking member in the home position.

In FIGS. 1, 2 and 3 a belt buckle presenter 10 is illustrated in different perspectives. The belt buckle presenter 10 comprises a belt buckle 12 coupled to a spindle drive 16 via force transmission means 14 (shown in sectional view in FIG. 5). The force transmission means 14, usually a cable, extends inside bellows 18 and a curved guide 20.

The spindle drive 16 is disposed in a casing 22 and comprises an electric drive motor 24. The casing 22 can be arranged at a vehicle seat or another vehicle component by means of plural mounting elements 26.

A plug 28 is provided for connecting the belt buckle presenter 10 to a power source and to vehicle electronics.

Each of the FIGS. 4, 5 and 6 shows a sectional view of the belt buckle presenter 10. In the casing 22 a threaded spindle 30 is pivotally arranged. The threaded spindle 30 is coupled to the drive shaft of the drive motor 24 at its rear end facing away from the belt buckle.

In the shown embodiment an electric drive motor 24 is arranged coaxially with the threaded spindle 30. However, also other types of motors as well as other arrangements of the motor relative to the threaded spindle, for instance including an interconnected transmission, can be provided.

At its front end facing the belt buckle 12 the threaded spindle 30 is supported by a front bearing 32 constituting, in normal operation, the radial or else the axial support, where appropriate, of the threaded spindle 30. In normal operation a mere radial bearing 34 is provided at the rear end of the threaded spindle 30.

The threaded spindle 30 includes at its rear end facing away from the belt buckle a radially widened portion, thereby forming a rear axial stop 36. The axial stop 36 of the threaded spindle 30 is configured so that upon bending the threaded spindle 30 the radially widened portion of the threaded spindle abuts against the casing 22, whereby the bending of the threaded spindle 30 out of its axis of rotation is limited in the case of restraint upon a heavy load of the threaded spindle 30.

A spindle nut 38 is arranged on the threaded spindle 30 and is guided through the casing 22 so that rotation of the spindle nut 38 about the axis of rotation of the threaded spindle 30 is not possible. Upon rotation of the threaded spindle 30 the spindle nut 38 moves in axial direction.

FIG. 6 illustrates the cut-out from FIG. 5 in a detailed view. A locking member 40 is provided for coupling the spindle nut 38 with the force transmission means 14. A mounting portion 42 of the locking member 40 is tightly connected to the force transmission means 14.

The locking member 40 is further coupled to the spindle nut 38, wherein both tensile and compressive forces can be transmitted in axial direction between the spindle nut 38 and the locking member 40. In the shown embodiment the locking member 40 and the spindle nut 38 are positively connected.

As mentioned before, the rotation of the threaded spindle 30 effectuates a movement of the spindle nut 38 in axial direction which is transmitted through the locking member 40 to the force transmission means 14 and the belt buckle 12 coupled thereto. In this manner, the belt buckle 12 is reciprocated between the provided belt buckle positions.

The locking member 40 further includes a reforming portion 44 which in normal operation is movable along the threaded spindle 30 in the axial direction and which in the case of restraint can be deformed by a restraining force acting on the belt buckle 12 so as to adopt a locking position in which the locking member 40 positively engages in the threaded spindle 30 via the reforming portion 44. The locking position of the locking member 40 is indicated by a broken line in FIG. 6.

The reforming portion 44 of the locking member 40 has an eye 46 the inner radius of which is larger than the radius of the threaded spindle 30 and which accommodates the threaded spindle 30 in the home position. In the shown embodiment the eye 46 is arranged substantially coaxially with the threaded spindle 30.

The spindle nut 38 includes a forming portion 48 which upon action of a predetermined restraining force induces a well-directed reforming of the locking member 40 into the locked position marked by the broken line, when the eye 46 is moved forward and along the forming portion 48 by the restraining force.

In FIGS. 7 to 19 a drive assembly of the belt buckle presenter is illustrated in different views. The drive assembly comprises the force transmission means 14 and the guide 20 thereof, the locking member 40 connected to the force transmission means 14, the threaded spindle 30, the spindle nut 38 and a mounting means 58 provided for mounting the locking member 40 to the spindle nut 38. The FIGS. 7 and 9 show exploded views of the drive assembly and the FIGS. 8 and 10 show views of the mounted drive assembly.

In the illustrated embodiment the force transmission means 14 comprises a flexible transmission member 50 for transmission of tensile forces, which is constituted, for instance, by a wire cable, as well as at least one compression-stable flexible guiding sleeve 52 for transmission of compressive forces. The guiding sleeve 52 includes plural sleeve-like segments pushed onto the transmission member 50 like beads and biased against each other by a spring. In this fashion, certain flexibility of the guiding sleeve 52 is ensured, whereby the guiding sleeve is capable of matching with the respective curvature within the guide 20, whereas outside the guide 20 the guiding sleeve 52 adopts a predetermined shape which is linear in the shown embodiment.

The transmission member 50 formed by the wire cable is tightly connected, for example clamped, welded or soldered, to the mounting portion 42 of the locking member 40.

The spindle nut 38 is made of plastic material in the shown embodiment and includes a central recess 54 in which a female thread adapted to engage in the thread of the threaded spindle 30 is formed.

The spindle nut 38 has plural extensions 56 allowing for a positive connection to the locking member 40 in axial direction. One of the extensions 56 constitutes the forming portion 48 of the spindle nut 38 at which the reforming portion 44 of the locking member 40 can be reformed in a defined manner.

A clamp connecting the locking member 40 to the spindle nut 38 is provided as a mounting means 58.

FIG. 11 illustrates the spindle nut 38 including the locking member 40 in the home position, the locking member 40 being movably arranged in axial direction along the threaded spindle 30. The eye 46 encloses the threaded spindle 30 without engaging in the thread.

Figure 12:
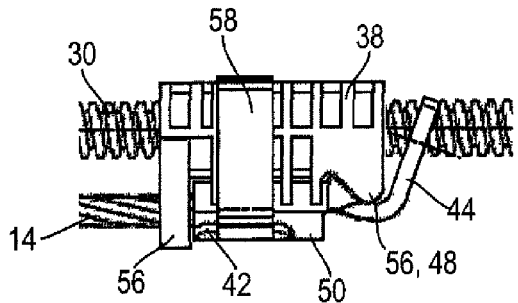
FIG. 12 shows a detailed view of the spindle nut including a locking member in the locked position.

FIG. 12 illustrates the spindle nut 38 including the locking member 40 in the locked position. The reforming portion 44 of the locking member 40 is inclined toward the axis of the threaded spindle 30, wherein the edge of the eye 46 engages in the thread of the threaded spindle 30. In this manner, the locking member 40 is positively connected to the threaded spindle 30. The flux of force in the case of tensile force at the force transmission means 14 is directly performed through the locking member 40 into the threaded spindle 30. The spindle nut 38 is not located in the flux of force in the locked position.

At its inner radius the eye 46 can have a surface structure that increases the friction between the locking member 40 and the threaded spindle 30 in the locking position, whereby the restraining force can be better transmitted to the threaded spindle 30.

In the shown embodiment symmetric flanks of the thread of the threaded spindle 30 are illustrated. However, asymmetric thread flanks can be provided for the threaded spindle 30, whereby the locking between the locking member 40 and the threaded spindle 30 can be optimized.

In normal operation the flux of force extends between the force transmission means 14 including the locking member 40 through the spindle nut 38 to the threaded spindle 30 and thus to the casing 22 which is connected to the vehicle seat. The connection between the locking member 40 and the spindle nut 38 is configured so that all tensile and compressive forces occurring in normal operation can be transmitted, thereby permitting a positioning of the belt buckle 12.

In the case of restraint, strong tensile forces which are absorbed by the force transmission means 14 occur at the belt buckle 12. The restraining force acts on the locking member 40 that deforms with a predetermined amount of the restraining force at the forming portion 48 of the spindle nut 38, the reforming portion 44 being inclined toward the axis of the threaded spindle 30, whereby the edge of the eye 46 engages in the thread of the threaded spindle 30 and thus a positive connection is established between the locking member 40 and the threaded spindle 30. The force transmission can now be effectuated directly between the locking member 40 and the threaded spindle 30, thereby relieving the spindle nut 38.

Figure 13:
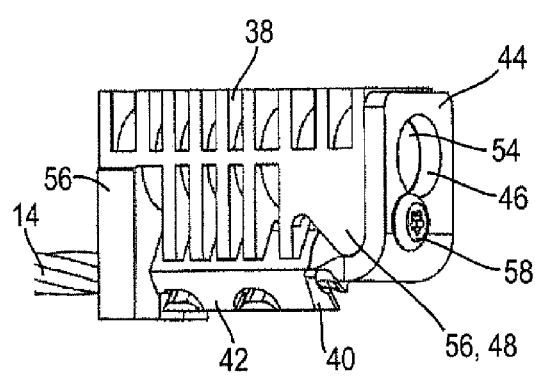
FIG. 13 is a second embodiment of a spindle nut including a locking member of a belt buckle presenter according to the invention in a perspective view.
Figure 14:
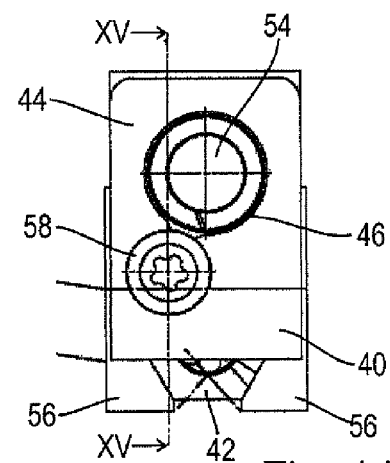
FIG. 14 shows a rear view of the spindle nut including a locking member according to FIG. 11.
Figure 15:
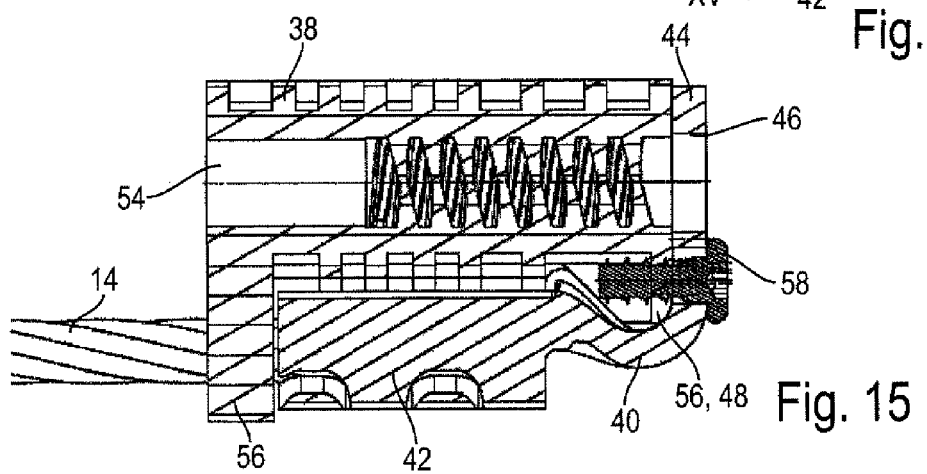
FIG. 15 shows a sectional view of the spindle nut and of the locking member along the sectional plane XV-XV of FIG. 14.

In the FIGS. 13, 14 and 15 a second embodiment of the unit of spindle nut 38 and locking member 40 is shown. In contrast to the first embodiment, as a mounting means 58 a screw disposed adjacent to the eye 46 and being screwed into the front end of the spindle nut 38 is provided instead of a clamp.

The spindle nut 38 can be manufactured in one piece or can be made of two parts in axial direction, the spindle nut 38 forming two shells which jointly surround the threaded spindle. In this manner, the spindle nut 38 can be mounted directly on the threaded spindle 30 without having to be screwed onto the same. Moreover, the locking member 40 can be accommodated or mounted wholly or partly inside the spindle nut 38 between the two shells.

At the spindle nut 38 a solenoid 60 is arranged which permits simple position sensing of the spindle nut 38 on the threaded spindle 30 by a sensor. There can also be provided a different type of sensor for determining the position.

In the shown embodiments the spindle drive 16 and/or the transmission constituted by the spindle nut 38 and the spindle 30 is/are formed to be self-locking. However, for the function of the belt buckle presenter it is merely necessary, with the predetermined restraining force, to generate an appropriate counterforce that permits a corresponding deformation of the locking member 40.

The invention claimed is:

1. A belt buckle presenter (10) for a seat belt system of a vehicle, comprising a belt buckle (12) coupled to a spindle drive (16) via force transmission means (14),
    wherein the force transmission means (14) includes a locking member (40) which
    in normal operation is movable along a threaded spindle (30) of the spindle drive (16) in an axial direction and
    in the case of restraint can be deformed by restraining force acting on the belt buckle (12) so as to adopt a locking position in which the locking member (40) positively engages in the threaded spindle (30).

2. A belt buckle presenter (10) for a seat belt system of a vehicle, comprising a belt buckle (12) coupled to a spindle drive (16) via force transmission means (14),
    wherein the force transmission means (14) includes a locking member (40) which
    in normal operation is movable along a threaded spindle (30) of the spindle drive (16) in an axial direction and
    in the case of restraint can be deformed by restraining force acting on the belt buckle (12) so as to adopt a locking position in which the locking member (40) positively engages in the threaded spindle (30),
    wherein the locking member (40) includes a mounting portion (42) at which the locking member (40) is tightly connected to the force transmission means (14) and a reforming portion (44) which is deformed in the locking position compared to a home position in normal operation.

3. The belt buckle presenter according to claim 2, wherein the reforming portion (44) of the locking member (40) has an eye (46) the inner radius of which is larger than the radius of the threaded spindle (30) and which accommodates the threaded spindle (30) in the home position.

4. The belt buckle presenter according to claim 3, wherein the reforming portion (44) including the eye (46) is inclined in the locking position toward the axis of the threaded spindle (30), wherein the edge of the eye (46) preferably engages in the thread of the threaded spindle (30) and/or the eye (46) has at its inner radius a surface structure that increases the friction between the locking member (40) and the threaded spindle (30) in the locking position.

5. A belt buckle presenter (10) for a seat belt system of a vehicle, comprising a belt buckle (12) coupled to a spindle drive (16) via force transmission means (14),
    wherein the force transmission means (14) includes a locking member (40) which
    in normal operation is movable along a threaded spindle (30) of the spindle drive (16) in an axial direction and
    in the case of restraint can be deformed by restraining force acting on the belt buckle (12) so as to adopt a locking position in which the locking member (40) positively engages in the threaded spindle (30),
    wherein the spindle drive (16) includes a spindle nut (38) and the locking member (40) is arranged at the spindle nut (38).

6. The belt buckle presenter according to claim 5, wherein the locking member (40) is deformed with a predetermined restraining force at the spindle nut (38) by a movement relative to the spindle nut (38), wherein the spindle nut (38) preferably has a forming portion (48) which induces a well-directed reforming of the locking member (40).

7. The belt buckle presenter according to claim 5, wherein the spindle nut (38) is positively connected to the locking member (40) and/or the force transmission means (14) in axial direction.

8. The belt buckle presenter according to claim 5, wherein a mounting means (58) is provided for connecting the locking member (40) to the spindle nut (38).

9. The belt buckle presenter according to claim 5, wherein the spindle nut (38) is made of plastic material.

10. The belt buckle presenter according to claim 5, wherein in the axial direction the spindle nut (38) is formed in two parts and constitutes two shells which jointly surround the threaded spindle (30) and in that the locking member (40) is preferably accommodated inside the spindle nut (38) between the two shells.

11. A belt buckle presenter (10) for a seat belt system of a vehicle, comprising a belt buckle (12) coupled to a spindle drive (16) via force transmission means (14),
- wherein the force transmission means (14) includes a locking member (40) which
- in normal operation is movable along a threaded spindle (30) of the spindle drive (16) in an axial direction and
- in the case of restraint can be deformed by restraining force acting on the belt buckle (12) so as to adopt a locking position in which the locking member (40) positively engages in the threaded spindle (30),
- wherein at its front end facing the belt buckle (12) the threaded spindle (30) has a front bearing (32) which in normal operation constitutes the support of the threaded spindle (30).

12. A belt buckle presenter (10) for a seat belt system of a vehicle, comprising a belt buckle (12) coupled to a spindle drive (16) via force transmission means (14),
- wherein the force transmission means (14) includes a locking member (40) which
- in normal operation is movable along a threaded spindle (30) of the spindle drive (16) in an axial direction and
- in the case of restraint can be deformed by restraining force acting on the belt buckle (12) so as to adopt a locking position in which the locking member (40) positively engages in the threaded spindle (30),
- wherein at its rear end facing away from the belt buckle (12) the threaded spindle (30) has a rear axial stop (36).

13. A belt buckle presenter (10) for a seat belt system of a vehicle, comprising a belt buckle (12) coupled to a spindle drive (16) via force transmission means (14),
- wherein the force transmission means (14) includes a locking member (40) which
- in normal operation is movable along a threaded spindle (30) of the spindle drive (16) in an axial direction and
- in the case of restraint can be deformed by restraining force acting on the belt buckle (12) so as to adopt a locking position in which the locking member (40) positively engages in the threaded spindle (30),
- wherein the threaded spindle (30) includes asymmetric thread flanks.

* * * * *